Figure 1:
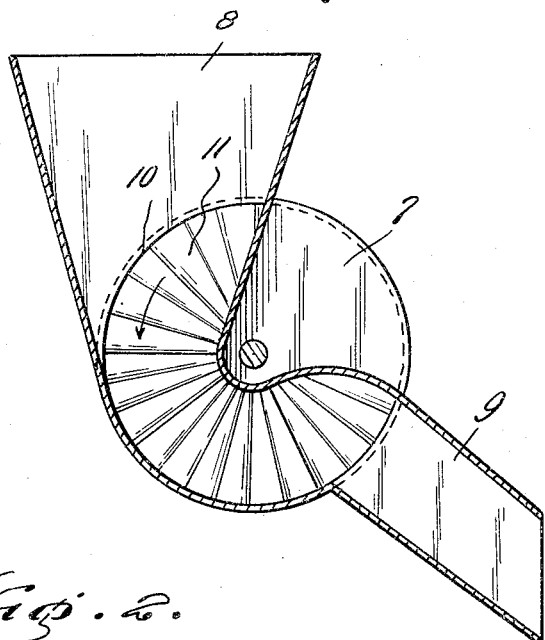

Dec. 20, 1927.

E. H. POWELL

NUT SHELLING MACHINE

Filed Aug. 27, 1925

1,653,413

Inventor

Ernest. H. Powell,

By Clarence A. O'Brien
Attorney

Patented Dec. 20, 1927.

1,653,413

UNITED STATES PATENT OFFICE.

ERNEST H. POWELL, OF SAN ANTONIO, TEXAS.

NUT-SHELLING MACHINE.

Application filed August 27, 1925. Serial No. 52,827.

The present invention relates to a nut kernel separating machine and has for its principal object to provide a machine which is efficient and reliable in separating the kernels of nuts from the shells.

A specific object of the invention is to provide a mangle through which the cracked nuts must pass, and by which they are rolled for separating the meat from the shell in simulation of the process which is quite commonly accomplished by rolling the cracked nuts, such as pecans between the hands.

A further important object of the invention is to provide a machine of this nature, which is simple in its construction, comparatively inexpensive to manufacture and operate, easy to manipulate, strong, durable, not likely to easily become out of order, and otherwise well adapted for the purpose for which it is designed.

With the above and numerous other objects in view, as will appear as the description proceeds, the invention resides in certain novel features of construction, and in the combination and arrangement of parts as will be hereinafter more fully described and claimed.

Figure 2:
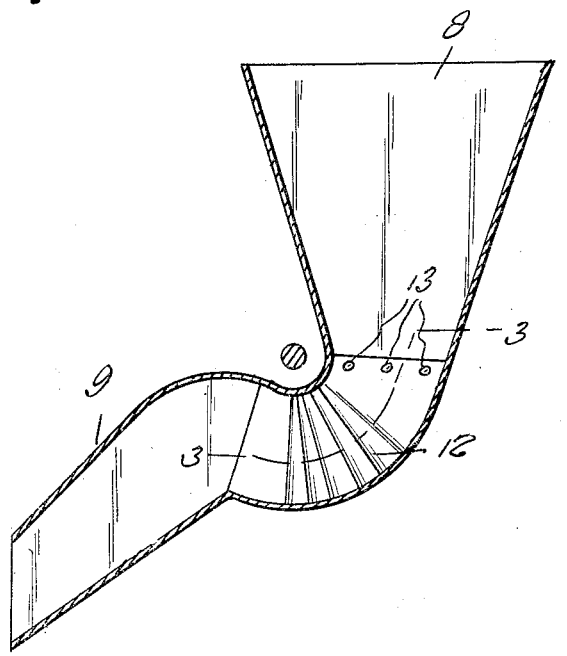
Figure 3:
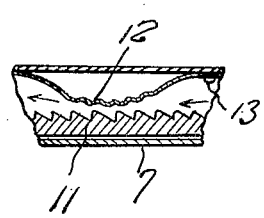

In the drawing:

Figure 1 is a vertical section through the apparatus embodying the features of my invention, Figure 2 is another vertical section therethrough looking in an opposite direction from Figure 1, and Figure 3 is a detail section taken substantially on the line 3—3 of Figure 2.

Referring particularly to mangle or rolling apparatus or mechanism, it will be seen that the numeral 7 indicates a cylindrical casing, having a substantially vertically and tangentially extending hopper 8, and a radially extending outlet spout 9. In the casing 7, there is journaled a mangle 10, of cylindrical formation, having one of its ends provided with radial corrugations 11. The thickness of the mangle 10 is much less than the width of the passage through the casing, which merges with the interiors of the hopper 8, and the spout 9. In this passage, there is fixed to one wall of the casing, a bowed leaf spring 12. The upper end of this spring is fixed, as at 13, and the lower end thereof is in slidable engagement with the wall of the casing. The intermediate portion of the spring is radially corrugated, the radial corrugations extending from the axis of the mangle 10. The outlet of a suitable nut cracking machine (not shown) delivers the nuts into the hopper 8, and when the mangle 10 is rotating, the nuts will be rolled between the corrugated ends thereof, and the corrugated bowed spring 12, thereby separating the meats of the nuts from the shells. Both the meat and shells, of course, will be mixed up and delivered, through the spout 9 onto the endless conveyor belt 3.

Having thus described my invention, what I claim as new is:

1. A device for extracting the meats from shells comprising a rotary corrugated member and a stationary spring corrugated member.

2. A device for rolling cracked nuts to extract the meat from the shells comprising a casing, a cylinder rotatable in the casing, one end of the cylinder having radial corrugations, a spring of bowed formation having radial corrugations thereon extending from the axis of the cylinder, and means for delivering cracked nuts into the casing between the spring and the cylinder.

In testimony whereof I affix my signature.

ERNEST H. POWELL.